INVENTORS
RAYMOND ABBOTT DeFOREST
ROBERT LINUS MOORE
BY
Roberts & Cohen
ATTORNEYS INVENTORS
RAYMOND ABBOTT DeFOREST
ROBERT LINUS MOORE BY Roberts & Cohen
ATTORNEYS INVENTORS
RAYMOND ABBOTT DeFOREST
ROBERT LINUS MOORE
BY
Roberts & Cohen
ATTORNEYS United States Patent Office 3,600,239

Patented Aug. 17, 1971

3,600,239
METHOD OF USING AND FOR FABRICATING ULTRASONIC BONDING GRADE ALUMINUM WIRE AND RESULTING PRODUCT

Raymond Abbott De Forest, New City, and Robert Linus Moore, Monsey, N.Y., assignors to Secon Metals Corporation, White Plains, N.Y.

Filed Nov. 26, 1968, Ser. No. 778,923
Int. Cl. C22c *21/02;* C22f *1/04*
U.S. Cl. 148—11.5A 13 Claims

ABSTRACT OF THE DISCLOSURE

In accordance with the invention there is provided a method which permits ultrasonically bonding silicon aluminum wire to transistors with improved effectiveness by preparing the silicon aluminum wire with a silicon content of about 1% with an improved method, the method more particularly comprising homogenizing a silicon aluminum material at an elevated temperature, followed by a quenching of the metal. There may be a subsequent forming of a wire from the metal or the wire may be previously formed in part or in entirety. Preferably, if the original ingot is homogenized, it will have a diameter of 1–2 inches. The ingot will have a preferred silicon content range of 0.50–1.50% and the homogenizing is effected preferably at a temperature of about 1050 deg. F. for a period of 1 to 24 hours after equilibrium is effected. Quenching is required and is preferably effected in salt water or in a glycol quenchant.

DRAWING

FIG. 2 is a photomicrograph subsequent to homogenization in accordance with the invention;

BACKGROUND

Figure 1:
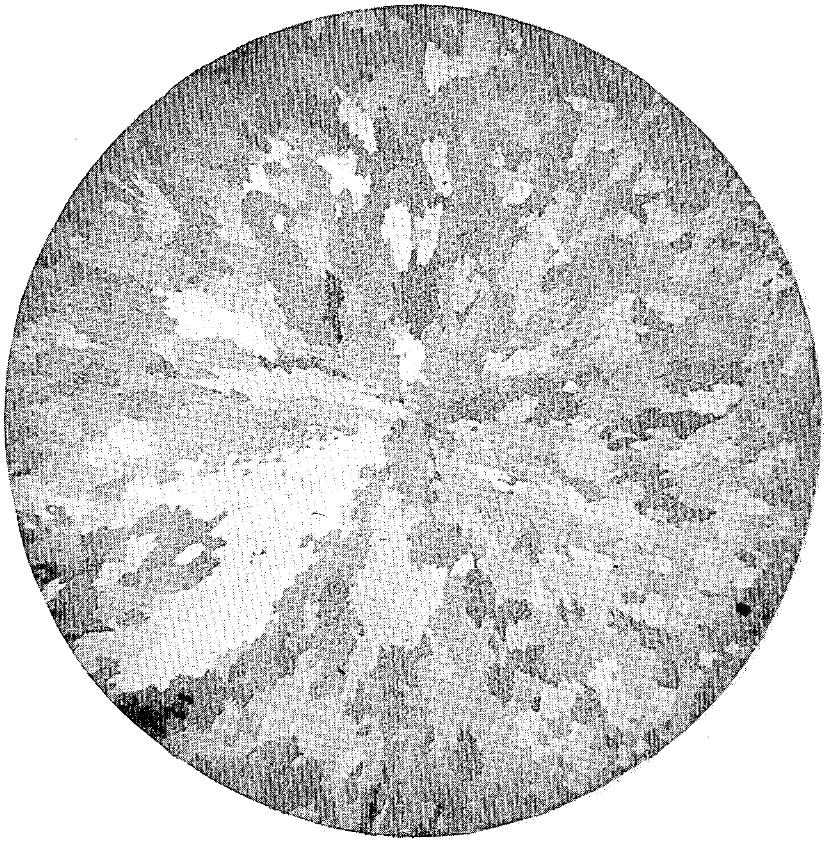
FIG. 1 is a photomicrograph of an ingot prior to homogenization.

A transistor is made of silicon or germanium to which a number of connections must be made. These connections are made between the transistor and posts which are located in a glass-to-metal seal. These connections, according to earlier techniques, were made with fine gold wire. A popular technique for connecting the fine gold wire was called "thermal compression bonding."

In the thermal-compression-bonding technique, a small wedge was used to press the gold wire down on a transistor which had been heated. The combining of pressure and heat caused a bond or attachment to be made. The same technique was used on the posts. An average size for this gold wire was about one thousandth of an inch.

There were several disadvantages to the use of gold and thermal compression bonding. One drawback was that the transistor itself had to be heated and this, in some cases, caused problems. Secondly, if the rectifying junctions of the transistor were made with aluminum, heat at the interface sometimes caused the formation of a nonconductive gold-aluminum compound which appeared as an open circuit.

One attempt to get away from the undesirable gold-aluminum compound was to bond, by thermal compression, a 1% silicon-aluminum wire to the aluminum surface. However, the thermal compression bonding of aluminum was not as reliable or as fast as could be achieved with gold. Other attempts at bonding aluminum were investigated and the one that showed the most promise and was universally adopted by the semiconductor industry was "ultrasonic bonding."

In ultrasonic bonding, a tool presses the aluminum wire to the aluminum substrate. However, no heat is applied. Ultrasonic energy is fed to the bonding tool. A combination of pressure and ultrasonic "scrub" produces the bond.

The aluminum wire for thermal compression bonding was universally supplied "full hard." Better results were obtained for ultrasonic bonding if the wire was either stress relieved or annealed. However, in no case was the wire as uniform as required.

Another problem involved was "tuning." To tune an ultrasonic bonder properly, the amount of power fed into the bonding tool must be turned for the particular wire being used. If too much power is used, the wire "scrubs out." If not enough power is used, no bonds is made. With a standard 1% silicon aluminum wire, it was difficult to tune a bonder properly and bonders had to be retuned from spool to spool and from shipment to shipment. To avoid this, a 1% silicon aluminum wire was required which would present a much higher homogeneity to the bonder and would make it easier to tune for optimum results and provide that tuning could remain constant from spool to spool and from shipment to shipment. Also, because of the possibility of optimizing tuning, higher bond strengths could be obtained in production.

DETAILED DESCRIPTION

This invention relates to methods of using and preparing ultrasonic-bonding-grade silicon-aluminum wires and to products of such methods.

It is an object of the invention to provide an improved silicon aluminum wire suitable for purposes having requirements heretofore too severe for commercially available silicon aluminum wire.

Historically speaking, 99.99% pure gold was originally employed for semi-conductor lead bonding material where thermal compression bonding techniques were employed. Because of technical problems involved with the use of gold wire on aluminum, an aluminum alloy was developed for thermal compression bonding. This aluminum alloy came to be known as the standard 1% silicon aluminum.

This standard 1% silicon aluminum alloy was the alloy originally employed, for example, by the semiconductor industry for ultrasonic bonding. However, as the industry became more sophisticated in its use of ultrasonic bonding equipment, problems with standard 1% silicon aluminum wire became apparent.

As an example, the hardness characteristic of wire is much more critical for ultrasonic bonding than it is for thermal compression bonding. Also, a certain lack of homogeneity of standard 1% silicon aluminum, which was not a problem with thermal compression bonding, gave rise to difficulties with ultrasonic bonding techniques.

A more specific object of the invention is to provide an improved bonding material suitable for use with ultrasonic bonding techniques and alloyed from materials having sufficient purity for semiconductor products.

In achieving the above objectives in accordance with the invention, there is provided a 1% silicon aluminum wire having the spectrographic purity of the standard 1% silicon aluminum, and having a more uniform and higher tensile strength than the standard alloy. At the same time, the elongation of the new 1% silicon aluminum wire is advantageously substantially higher.

It is a feature of the invention to enable providing the aforesaid improved material in either hard or stressed relieved conditions such that when employed with ultrasonic bonding techniques, higher bond pull-strengths are obtained.

In achieving the objects of the invention, the method of preparing the material is critical. Generally, in accordance with the invention, a method of preparing a 1% silicon aluminum wire must comprise homogenizing silicon aluminum at an elevated temperature below its melting point for at least one hour beyond equilibrium and thereafter quenching the same. The wire can be formed before or after homogenization. The aluminum should have a silicon content of 0.50–1.50% and the homogenizing will be preferably effected at a temperature between 846 deg. F. and 1177 deg. F. for 1 to 24 hours after equilibrium, and even more preferably for 8 hours or more at 1050 deg. F. The aluminum will preferably have a 1% silicon content or as close thereto as is commercially practical.

The wire can be formed by cold reduction techniques at a temperature of less than 450 deg. F. The quenching mentioned above is preferably effected in salt water or in a glycol quenchant as will be explained in greater detail hereinafter. Preferably, if an ingot is subjected to the aforesaid homogenization, it will have a diameter of 1 to 2 inches and the ingot will be previously formed by such a method as will minimize the inclusion of oxides therein.

Generally, the preparation of wire in accordance with the invention will have three main stages which can be denominated as (1) a pre-homogenization stage, (2) the homogenization stage, and (3) the post-homogenization stage. Where the wire is first formed and then homogenized, the third stage may sometimes be omitted. The homogenization stage being the most important will be explained first.

For the homogenization stage, the aluminum can be in ingot form (as cast) or may have already been cold worked completely or partially to its wire form. If the metal is in ingot form, the ingot will preferably by cylindrical although other shapes can be employed, such as rectangular, triangular, oval and the like. Such ingot will be a 1% silicon aluminum ingot, the silicon percentage ranging as aforesaid from 0.50 to 1.50%. The length of the ingot is not critical, provided that the ingot can be subjected to the treatment hereinafter explained and that temperature equilibrium can be established.

On the other hand, the metal can be worked prior to homogenization and can, for example, be cold worked, swaged or extruded to wire form. The wire will then be subjected to homogenization.

It has been found that by subjecting the metal to homogenization as hereinafter described in greater detail, a great homogeneity of crystalline structure and dispersion of silicon (see FIGS. 1 and 2) can be obtained which leads to tensile strength and elongation characteristics which make the material suitable for ultrasonic bonding techniques. This homogenization must be effected at a temperature within the ranges indicated in FIG. 3 and up to but not including the melting point of the material. Preferably, the homogenization is effected at a temperature range of between 846 deg. F. and 1177 deg. F. The preferred temperature within this range is about 1050 deg.

F. at which temperature homogenization is preferably effected for approximately 24 hours. The range of times through which homogenization can be effected is preferably determined by the time necessary to achieve temperature equilibrium in the material. If certain sacrifices in quality are permissible, the homogenization can be effected for less than 1 hour after equilibrium with the upper range limit being limited only by considerations of economy.

A critical step in connection with the homogenization is that the material be thereafter hot quenched (i.e., the material will be quenched before being cooled) in a suitable quenchant. Two quenchants have been found particularly suitable in connection with this operation and these are salt water and commercially available glycol quenchants. Certain other quenchants have been tried but have been found unsuitable. These include fresh water and conventional quenching oils.

Although not ilimited thereto, it is believed that quenchants will not work in the homogenization process of the invention if steam jackets are formed around the ingot when the ingot is subjected to quenching. Fresh water and oil quenchants are believed to form such a jacket. However, salt water is believed to avoid this undesirable consequence in view of the specific heat characteristics thereof and, for some reason which has not yet been found susceptible of explanation, the use of glycol quenchants will also provide a finished material suitable for the purposes of the invention.

The upper temperature range of the homogenizing operation is, as a theoretical matter, limited to the melting point of the ingot. However, for production techniques, there has to be taken into account the accuracy of the control equipment and thus an upper temperature limit of 1177 deg. F. can be established as a practical matter for low percentages of silicon and an even lower temperature limit is necessary for higher silicon contents.

Where the ingot is to be homogenized and is to be provided in the crucible in which the original melt is formed, as will be discussed hereinafter, the homogenization can be effected in the crucible itself to limit, as much as possible, the formation of oxides and the inclusion in the ingot of oxides which might have a serious effect on the high quality desired in accordance with invention.

After such ingot has been homogenized, it is then subjected to size-reduction processes in order to form a wire therefrom. These reduction processes should be limited to cold reduction processes which do not cause the metal to achieve a temperature exceeding 450 deg. F., failing which the benefit of invention might be lost. Such cold reduction will preferably be effected to a final wire size within the range of .0004 and .005 inch which are suitable sizes for ultrasonic bonding techniques in the semi-conductor industry. Other sizes are also possible.

The cold reduction may be effected by means of known rolling, swaging or forging techniques and any combination thereof, provided that the aforesaid temperature limitation of 450 deg. F. is not exceeded.

There are a number of processes by which an ingot can be prepared, in stage 1, for being subsequently subjected to the homogenization process of the invention. Those procedures will be satisfactory provided that the silicon content is within the range of 0.50–1.50% silicon with iron, copper and magnesium contents each less than .001%. The following are two examples of the preparation of ingots to be subjected to homogenization in accordance with the invention or to be cold worked and then subjected to such homogenization:

EXAMPLE 1

In a first procedure for preparing an ingot for homogenization in accordance with the invention there is employed a 1% silicon aluminum alloy within the aforesaid limitations. A zirconium oxide bottom-pour crucible is employed and there are also used an aluminum flux and a dry nitrogen which serves as the scavenging gas. An iron mold is employed with a size adapted for a 20 ounce melt. The pouring temperature is 1400 deg.–1450 deg. F. and the melt is slow poured from the bottom of the mold.

By way of particulars, ¼ of a 1000 ml. glass beaker is filled with the aforesaid flux which is heated for 10 minutes over a Bunsen burner before being used. The aluminum is melted and covered with the flux. A good flux cover is maintained from this point of the process to the casting. After the melt is covered with flux, the silicon or silicon aluminum master is added and the melt is brought to 1400 deg. F. The dry nitrogen is bubbled through the melt for 15 minutes to serve as a scavenging gas. The heated mold is filled with nitrogen immediately prior to the pouring, whereafter the melt is poured into an iron mold in a steady unbroken stream to minimize the inclusion of oxides in the ingot. Thereafter the ingot is subjected to homogenization in the manner which has been indicated above and possibly before being removed from the mold in order to minimize the formation of oxides and also to minimize the effect on crystalline structure of the ingot. Alternately, the ingot can be cold worked and then homogenized.

EXAMPLE 2

As in the prior procedure, a 1% silicon aluminum ingot is to be prepared. As a crucible, there is employed a fused quartz tube having a length of about 12" and inside diameter of 1½", the tube being closed at one end. A mixture of fluoride and chloride salts of any conventional flux composition serves as the aluminum flux. Argon is employed as the scavenging gas.

1½ ounces of aluminum flux are added to the tube, whereafter the silicon aluminum is added to the tube and melted. The melting temperature does not exceed 1400 deg. F. at any time in order to minimize the oxide content.

With the temperature at 1400 deg. F. or less, argon gas is employed for purposes of scavenging for a period of about 10 minutes. Thereafter a rapid quench of the melt is effected in the crucible in water at room temperature. The melt is preferably not slow quenched, since if the melt is cooled slowly there will be a strong coring effect with the silcon freezing out as pure silcon.

Particular advantage has been found in quenching by plunging the melt in the crucible into water to within 1 inch from the top of the molten metal. This permits a 1 inch freeboard and minimizes the shrinkage pipe. The melt is held in water at such depth for approximately 3 minutes. The rest of the melt is cooled by being lowered slowly into the water.

The ingot thus formed is subjected to the homogenization procedure hereinbefore described or is first cold worked and then subjected to homogenization.

Ultrasonic bonding grade wire formed in accordance with the aforesaid procedures have been made in a wide variety of sizes and have been subjected to tests which disclose the advantageous characteristics indicated in the following table based on homogenizing the ingot before cold working the same:

TABLE I

Typical analysis (spectrographic): Fe, .000X%; Cu, .000X%; Mg, .000X%; Silicon content 0.50–1.50%. Specific resistance (25° C.): 18.6 ohms/CMF± 5%.

| | Hard | | Stress relieved | |
|---|---|---|---|---|
| Diam. | Elong., percent | Tensile, grams | Elong., percent | Tensile, grams |
| .0004 | 0.75–1.5 | 2.5–3.5 | 0.85–1.5 | 2–3 |
| .0005 | 0.75–1.5 | 4–5 | .75–1.5 | 3–4 |
| .007 | .75–1.5 | 8–10 | .75–1.5 | 7–8.5 |
| .001 | 1.5–3 | 17–21 | 1.5–3 | 14.5–17.6 |
| .0015 | 1.5–3 | 39–48 | 1.5–3 | 34–41 |
| .002 | 2–5 | 70–80 | 2–5 | 58–71 |
| .003 | 2–5 | 165–185 | 2–5 | 139–157 |
| .004 | 2–5 | 290–320 | 2–5 | 247–273 |
| .005 | 2–5 | 485–535 | 2–5 | 411–455 |

The following tests indicate annealing temperatures and times and resulting tensile strength and elongation characteristics for a .001" 1% silicon aluminum wire processed other than in accordance with the invention:

TABLE II

| Annealing temp., ° C. | Tensile, grams | Elongation, percent |
|---|---|---|
| 300 | 13.0 | 0.75 |
| 300 | 14.0 | 1.0 |
| 300 | 13.5 | 1.0 |
| 300 | 13.0 | 1.0 |
| 300 | 12.2 | 0.5 |
| 300 | 12.4 | 0.75 |
| 300 | 12.0 | 0.75 |
| 300 | 11.1 | 0.5 |
| 300 | 11.2 | 0.5 |
| 300 | 10.7 | 0.5 |
| 350 | 10.0 | 0.5 |
| 350 | 9.5 | 1 |
| 400 | 3.2 | 0.9 |
| 400 | 5.9 | 0.4 |
| 400 | 5 | 1.2 |
| 400 | 3.5 | 0.8 |
| 400 | 4.3 | 1.5 |
| 400 | 2.9 | 1.3 |
| 450 | 8.5 | 1.0 |
| 500 | 3.2 | 0.9 |
| 500 | 4.1 | 1.2 |
| 500 | 4.5 | 1.3 |
| 550 | 3.3 | 1.5 |
| 550 | 3.1 | 1.4 |
| 550 | 2.9 | 1.9 |

The data in Table II is typical of the type of silicon wire heretofore available in which a tensile strength of 14 grams was characteristic along with an elongation of 0.5–1.5%. No matter what was done to this previously available wire, the 0.5–1.5% elongation remained characteristic and heat treatment merely changed the tensile strength range.

While this prior product was adequate for thermal compression bonding, the additional criticality of ultrasonic bonding techniques made such wire unacceptable for commercial usage. Moreover, it was found that such wire lacked suitable uniformity of characteristics such that in connection with ultrasonic bonding techniques the wire might in one zone scrub out completely, or in another zone be so hard that ultrasonic bonding techniques could not bond the material at all.

A further major advantage of the product made in accordance with the instant invention is that the uniformity of the silicon dispersion in the alloy as well as other unknown and as yet unidentified physical improvements result in high elongation and tensile strength both of which properties are extremely desirable in ultrasonic bonding. The change in crystalline structure and silicon dispersion due to the homogenization appears from a comparison of FIGS. 1 and 2 respectively showing before and after homogenization.

From what has been stated hereinabove, it will now appear that the invention embraces a method of preparing silicon aluminum wire within a silicon content range of 0.50–1.50% (but preferably about 1%) by homogenizing silicon aluminum at a temperature of from 846 deg. F. up to the melting point of the alloy. Homogenization is preferably effected for at least 1 hour and preferably from 6 to 16 hours after equilibrium is achieved. Thereafter, the material is suitably quenched in salt water or in a commercially available glycol quenchant. A wire of approximately .0004–.005 inch is generally the desired product as it is suitable for being ultrasonically bonded such as, for example, to a semi-conductor body.

While the ability of the product of the instant invention to exhibit excellent characteristics with respect to ultrasonic bonding techniques is principally ascribed to improved tensile strengths and elongation characteristics, the invention is not limited to such theory inasmuch as the greatly improved results of this invention are probably not to be explained so simply and likely find additional basis in the above-noted peculiarly advantageous crystalline structure and silicon dispersion obtained by processing 1% silicon aluminum alloys in accordance with the procedures indicated hereabove.

Figure 3:
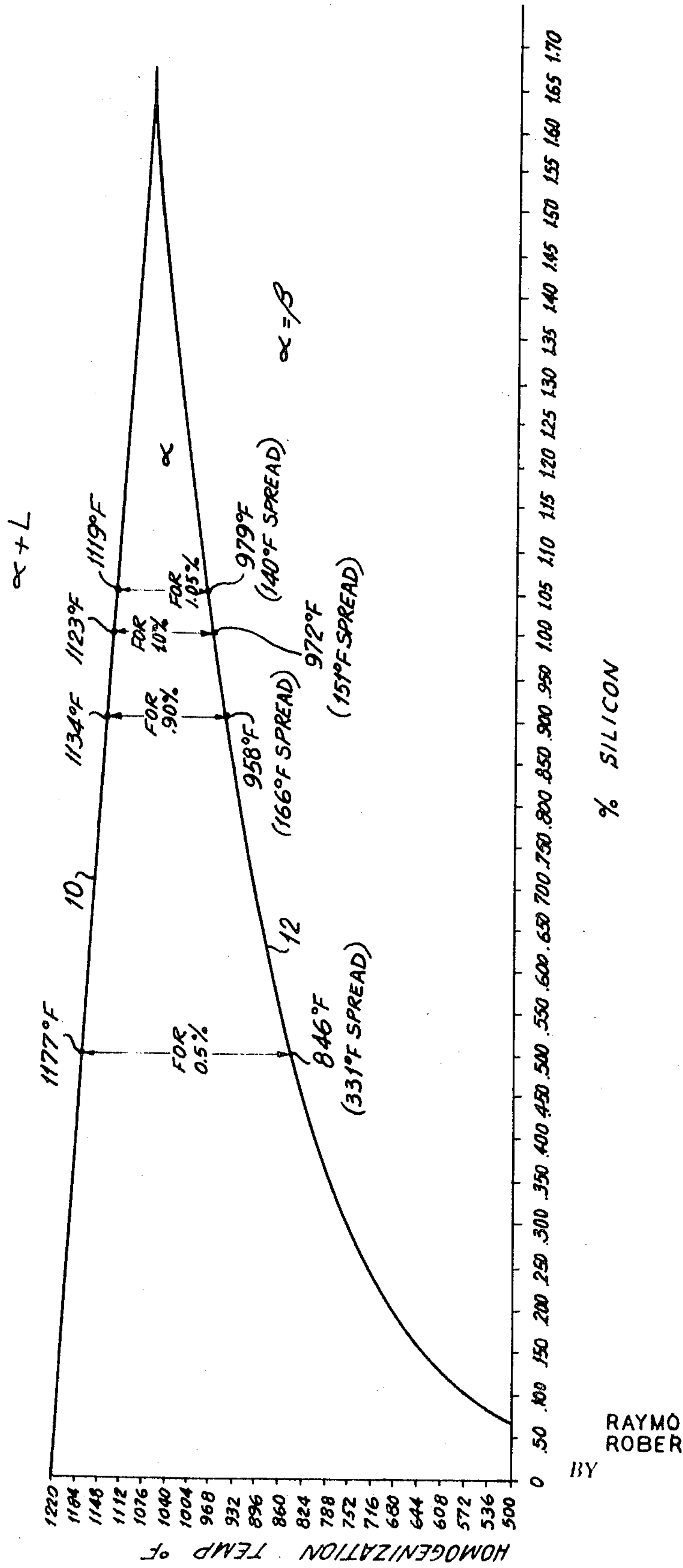
FIG. 3 is a graph showing critical homogenization ranges.

FIG. 3 is a chart illustrating the critical temperature limitations of the homogenization of the invention with respect to different silicon contents. The horizontal ordinate of the graph is based on percentage content of silicon. The vertical ordinate is indexed in degrees Fahrenheit.

The upper limit or solidus limit line 10 of the temperature range shows a decline as the percentage of silicon increases. This is representative of the decreasing melting point of the silicon aluminum material as the percentage of silicon increases. The lower limit or solvus limit line 12 of the critical temperature range increases according to some exponential function and indicates that the minimum critical temperature increases as the silicon content increases.

The critical temperature range is indicated as alpha. The temperature range above this critical range is indicated in the graph as alpha+L. The temperature range lying below the critical temperature is indicated as alpha+$\beta$.

The useful ranges of silicon content for the invention have been selected as extending from 0.50% to 1.50%. It will, however, be appreciated from the graph of FIG. 3 that this silicon range can be exceeded in either direction, while nevertheless permitting the homogenizing in accordance with the invention. Thus, for example, it will be seen that the alpha zone exists up to a silicon content of approximately 1.65%, while this zone is a matter of fact increases in range for silicon contents below 0.50%.

Considering the silicon content of 0.50% by way of example, it appears from the graph that the lower limit is 846 deg. F. The upper range for this silicon content is 1177 deg. F. Any temperature lying within this range for this particular silicon content will be effective in accordance with the invention. It will be understood, however, that as higher temperatures are employed the amount of time required to establish temperature equilibrium throughout the metal being processed will be decreased.

Other maximum temperatures are indicated by way of example on the graph, such as for example 1134 deg. F., 1123 deg. F. and 1119 deg. F. for 0.90%, 1.00% and 1.05% silicon contents respectively. Correspondingly, there are indicated minimum limits of 958 deg. F., 972 deg. F. and 979 deg. F. for the same respective silicon contents.

In accordance with the invention, the metal being processed is brought to equilibrium such that there is an even distribution of temperature throughout. Thereafter, the metal will be held at a temperature within the critical range alpha for preferably 1 to 24 hours, the latter maximum limit being selected for purposes of economy.

In the table listed hereinabove, the results were based on wire formed from a material which was homogenized while in ingot form and prior to a cold working thereof. It has been stated herein that the homogenization can be effected after cold working and, in fact, it is possible to homogenize before and after cold working, as will be shown by the following additional examples:

EXAMPLE A

An ingot formed according to Example 2 was subjected to cold reduction and formed into a wire of a diameter of .500". Various silicon contents were employed for the different ingots and these were subsequently homogenized according to the critical limitations indicated in FIG. 3. Wires were subsequently formed to a diameter of about .001".

EXAMPLE B

The procedure of Example A was followed, except that prior to homogenization the silicon aluminum was cold worked to a diameter of .040". Thereafter, homogenization according to FIG. 3 was carried out and wires of diameters between .0004" and .005" were formed.

EXAMPLE C

The procedure of Example A was followed, except that prior to homogenization the silicon aluminum was cold worked to a diameter of .020". Thereafter, homogenization was effected according to FIG. 3 and wires of .005" were formed.

EXAMPLE D

The procedure according to Example A was followed, except that the original ingot was subjected to homogenization and a second homogenization followed the cold working of the ingot down to .500".

EXAMPLE E

The procedure according to Example B was followed, with the exception that the original ingot was homogenized according to FIG. 3 prior to cold working.

EXAMPLE F

The procedure according to Example C was followed, except that the original ingot was subjected to homogenization before being subjected to cold working.

EXAMPLE G

Ingots were formed according to Examples 1 and 2, but were not subjected to homogenization. These ingots were reduced to .500", .040" and .020" respectively. After such cold reduction, the metal was homogenized according to FIG. 3 and thereafter the metal was further cold worked down to various wire sizes within a range of .0004" and .005". The wires in their final forms were subjected to homogenization according to FIG. 3.

The following additional examples apply to cases in which the ingots were homogenized and thereafter cold worked to a wire having a diameter of .001".

EXAMPLE H

Ingots having a .500% silicon content were homogenized at various temperatures between 842 deg. F. and 1166 deg. F. The resulting .001" wires had the benefits referred to above.

EXAMPLE I

Ingots having a .750% silicon content were respectively homogenized at temperatures of from 914 deg. F. to 1148 deg. F. The resulting wires had the superior characteristics of the invention.

EXAMPLE J

Ingots having a 1.00% silicon content were homogenized at various respective temperatures between 968 deg. F. and 1120 deg. F. The characteristics of the invention were obtained.

EXAMPLE K

Ingots having a 1.250% silicon content were respectively homogenized at different temperatures between 1013 deg. F. and 1096 deg. F. The advantages of the invention were obtained.

EXAMPLE L

Ingots having a 1.500% silicon content were homogenized at respecticely different temperatures of from 1040 deg. F. to 1076 deg. F. Wires produced from these ingots had the crystalline structure of FIG. 2.

The various examples given hereinabove provide the advantages inherent in the improved crystalline structure and silicon dispersion illustrated in FIGS. 1 and 2.

Figure 4:
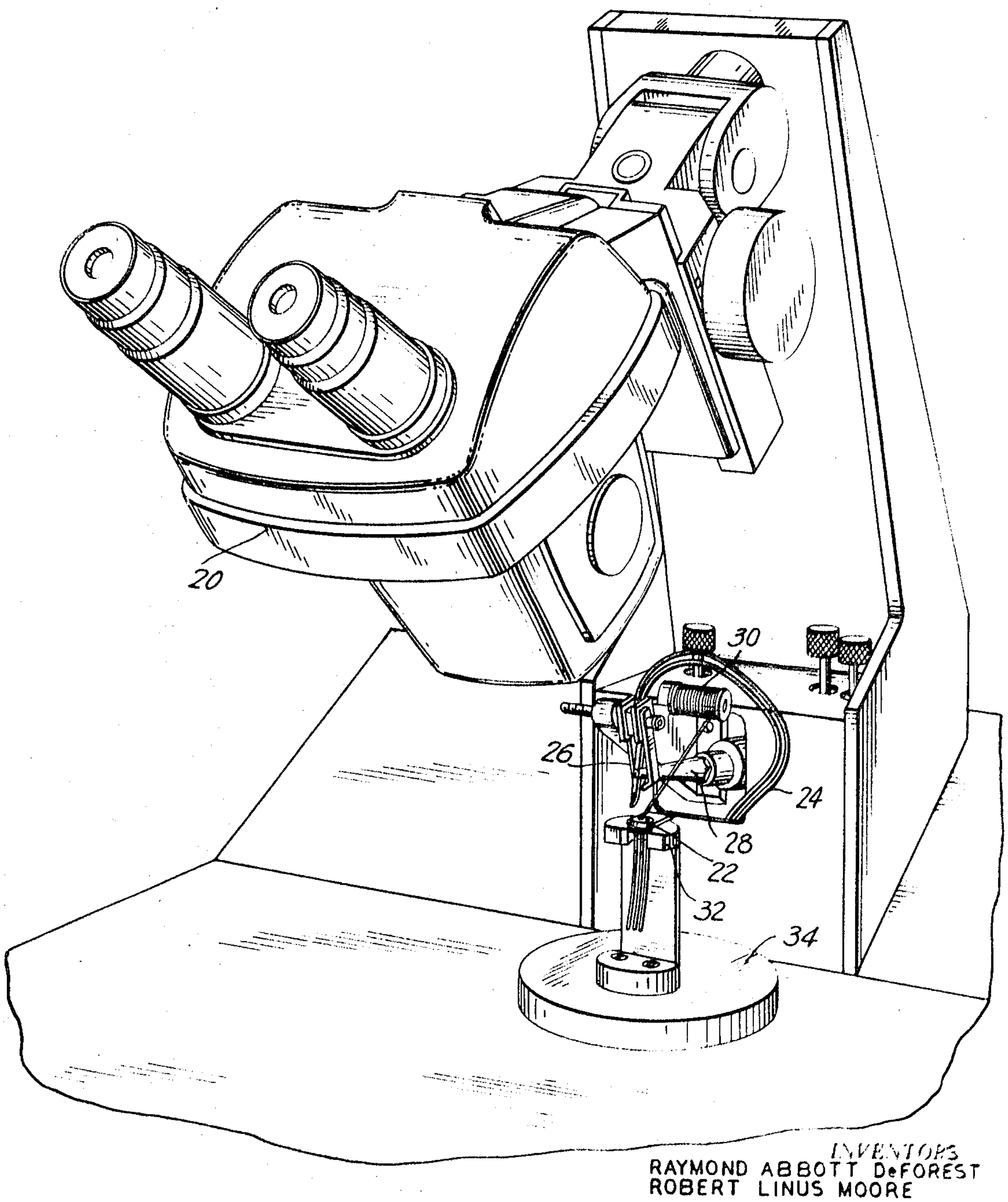
FIG. 4 illustrates one type of ultrasonic bonding equipment with which the wire of the invention is employed.

As has been noted hereinabove, wires prepared in accordance with the invention are preferably used in connection with ultrasonic bonding techniques. Various types of devices for ultrasonic bonding are well known, but one such apparatus is illustrated in FIG. 4 by way of example. In FIG. 4 is generally indicated a microscope 20 enabling close observation of the transistor 22 to which the weld is being made. Welding power is supplied via lines 24 to a welding head generally indicated at 26. Ultrasonic vibrations are provided by a head 28. A spool of wire prepared in accordance with the invention is indicated at 30. The transistor is held by a support 32 mounted on a base 34.

There will now probably appear to those skilled in the art many modifications and variations of the techniques set forth. These modifications and variations will not depart from the scope of the invention if defined by the following claims.

What is claimed is:

1. A method of preparing silicon aluminum wire comprising homogenizing silicon aluminum at a temperature of between 846 deg. F. and up to the melting point thereof for at least one hour, and quenching said silicon aluminum, a wire being formed from the said silicon aluminum, said silicon aluminum being of a 0.50–1.50% silicon content and the homogenizing being effected at a temperature between 846 deg. F. and 1177 deg. F. for at least as long as is required to establish temperature equilibrium in the silicon aluminum, said temperature being between the solidus and solvus limit.

2. A method as claimed in claim 1, wherein said silicon aluminum has an approximately 1% silicon content and is homogenized at about 1050 deg. F.

3. A method as claimed in claim 1, wherein the wire is formed by cold reduction at a temperature of less than 450 deg. F.

4. A method as claimed in claim 3, wherein the silicon aluminum is homogenized before cold reduction.

5. A method as claimed in claim 3, wherein the silicon aluminum is homogenized after cold reduction.

6. A method as claimed in claim 1, wherein the quenching is effected in salt water or a glycol quenchant.

7. A method as claimed in claim 1, wherein the silicon aluminum is an ingot having a diameter of 1–2 inches.

8. A method as claimed in claim 1, wherein the silicon aluminum is an ingot which is formed into a wire of about .0004–.005 inch.

9. A method as claimed in claim 1, wherein the homogenization is prolonged for 1–24 hours after equilibrium is effected.

10. A method as claimed in claim 1, wherein the silicon aluminum is originally formed as an ingot and is then cold worked into wire form.

11. A method as claimed in claim 10, wherein the silicon aluminum is homogenized before cold working.

12. A method as claimed in claim 10, wherein the silicon aluminum is homogenized after cold working.

13. A method as claimed in claim 10, wherein the silicon aluminum is homogenized before and after cold working.

References Cited

UNITED STATES PATENTS 2,258,681 10/1941 Hoglund ............. 75—148

L. DEWAYNE RUTLEDGE, Primary Examiner

W. W. STALLARD, Assistant Examiner

U.S. Cl. X.R.

75—148